United States Patent [19]

Shaffer et al.

[11] Patent Number: 4,798,395
[45] Date of Patent: Jan. 17, 1989

[54] CYCLE APPARATUS HAVING THERAPEUTIC AND UTILITY ASPECTS

[76] Inventors: Don T. Shaffer, 5968 Culzean Dr., Apts. 1620, Trotwood, Ohio 45426; Emmert Milyard, Box 11, Brookville, Ohio 45309

[21] Appl. No.: 897,383

[22] Filed: Aug. 18, 1986

Related U.S. Application Data

[62] Division of Ser. No. 618,193, Jun. 7, 1984, Pat. No. 4,619,462.

[51] Int. Cl.$^4$ ............................................. B62M 1/14
[52] U.S. Cl. ...................................... 280/240; 272/73; 272/144; 280/246; 280/282
[58] Field of Search .................... 280/242 R, 244, 246, 280/298, 87.04 R, 240, 242 WC, 281 LP, 87.02 R, 247, 220, 233, 290, 282; 272/73.1, 73, 93, 70, 127, 144; D12/131, 132; 5/83–87, 89

[56] References Cited

U.S. PATENT DOCUMENTS

| | | | |
|---|---|---|---|
| 93,751 | 8/1869 | Sawhill | 280/242 R |
| 588,472 | 8/1897 | Raymond | 280/240 |
| 626,852 | 6/1899 | Bemis | 280/244 |
| 2,317,606 | 4/1943 | Harris | 280/242 R |
| 3,042,131 | 7/1962 | Dovci | 5/83 |
| 3,854,754 | 12/1974 | Jablonski | 280/242 R |
| 4,411,443 | 10/1983 | Pollard | 280/281 LP |

FOREIGN PATENT DOCUMENTS

| | | | |
|---|---|---|---|
| 827167 | 1/1952 | Fed. Rep. of Germany | 280/242 R |
| 766717 | 7/1934 | France | 280/242 R |
| 2455540 | 1/1981 | France | 280/240 |
| 173599 | 2/1935 | Switzerland | 280/246 |
| 4393 | of 1902 | United Kingdom | 280/244 |
| 3815 | of 1907 | United Kingdom | 280/281 |

Primary Examiner—David M. Mitchell
Assistant Examiner—Everett G. Diederiks, Jr.
Attorney, Agent, or Firm—Jerome P. Bloom

[57] ABSTRACT

An exercising, recreational and utilitarian apparatus, particularly useful for persons handicapped as to use of their lower limbs or having cardio-pulmonary or ancillary physical problems, comprising a mobile chassis having forward and rearward ends referenced to the normal direction of its motion and mounting a forwardly and upwardly inclined adjustable support having thereon a body rest for mid and upper portions of the body of a user and immediately to the rear thereof an upwardly projecting vertically inclined forwardly facing seat which backs the buttocks of the user and induces the forward inclination of the mid and upper portions of the user's body. Immediately forward of said support, within easy and comfortable reach by the user's hands, is a transversely extending rod-shaped control bar which commonly mounts the controls for driving, steering and braking said apparatus in the course of its travel. Such controls include a pair of relatively rotatable, laterally spaced, hand manipulated levers through the medium of which said apparatus may be driven, immediately of which levers, and within the reach of fingers of hands gripping said levers, are brake controls which can be operated without removing the hands from said levers. At the same time, without removing the hands from the control levers, the rod shaped control bar is rockable about an axis extending longitudinally of said chassis for steering purposes.

12 Claims, 5 Drawing Sheets

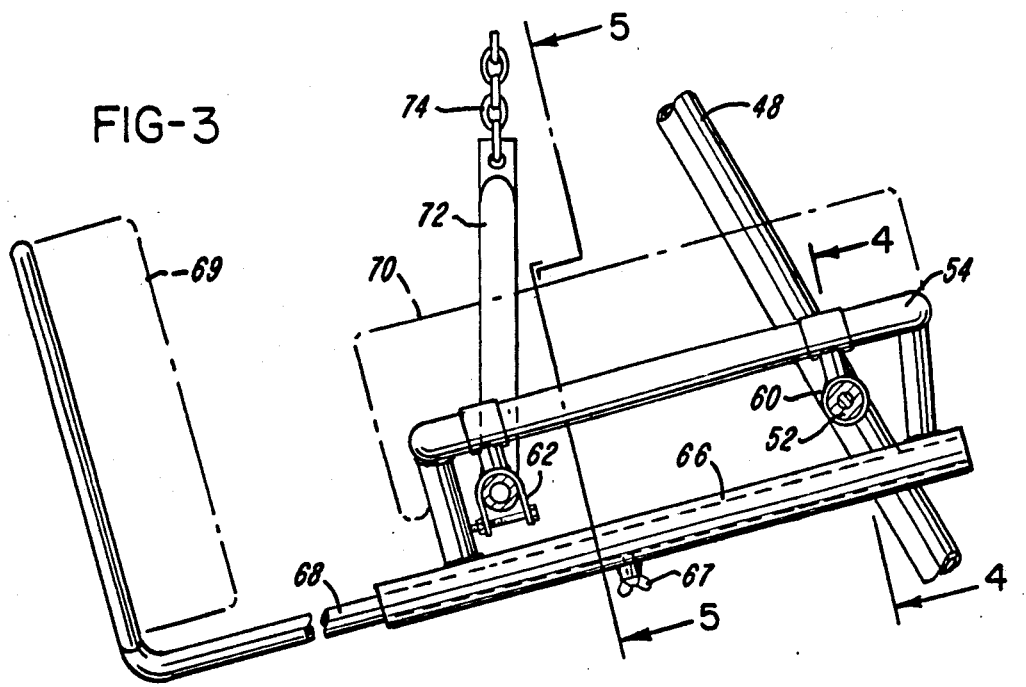
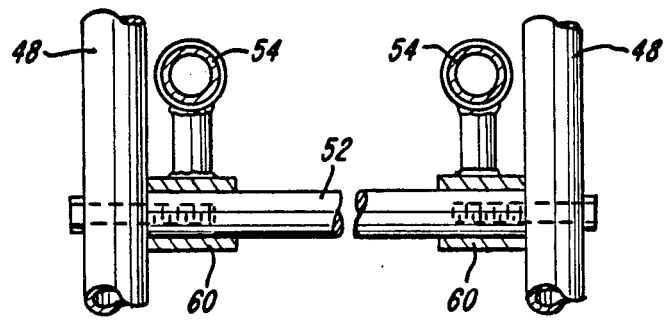
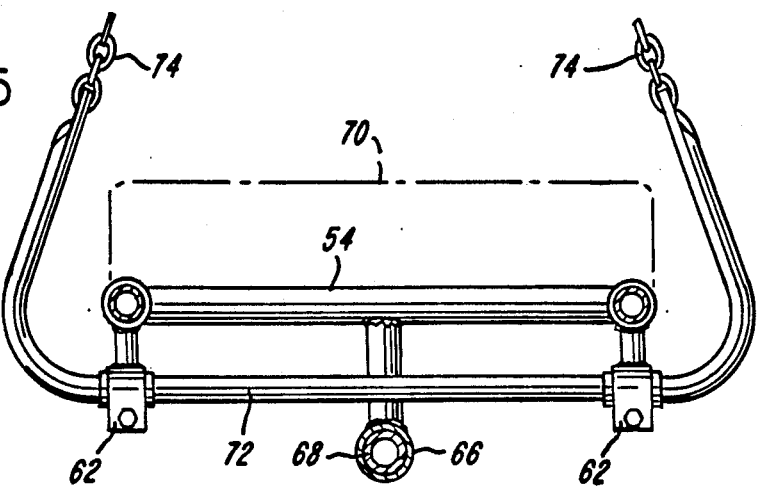

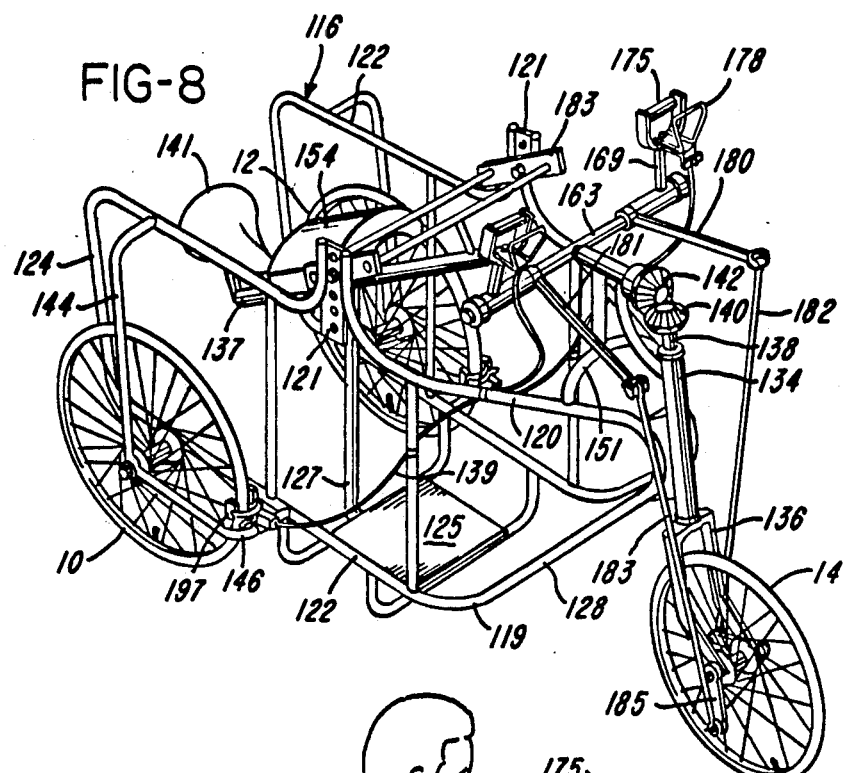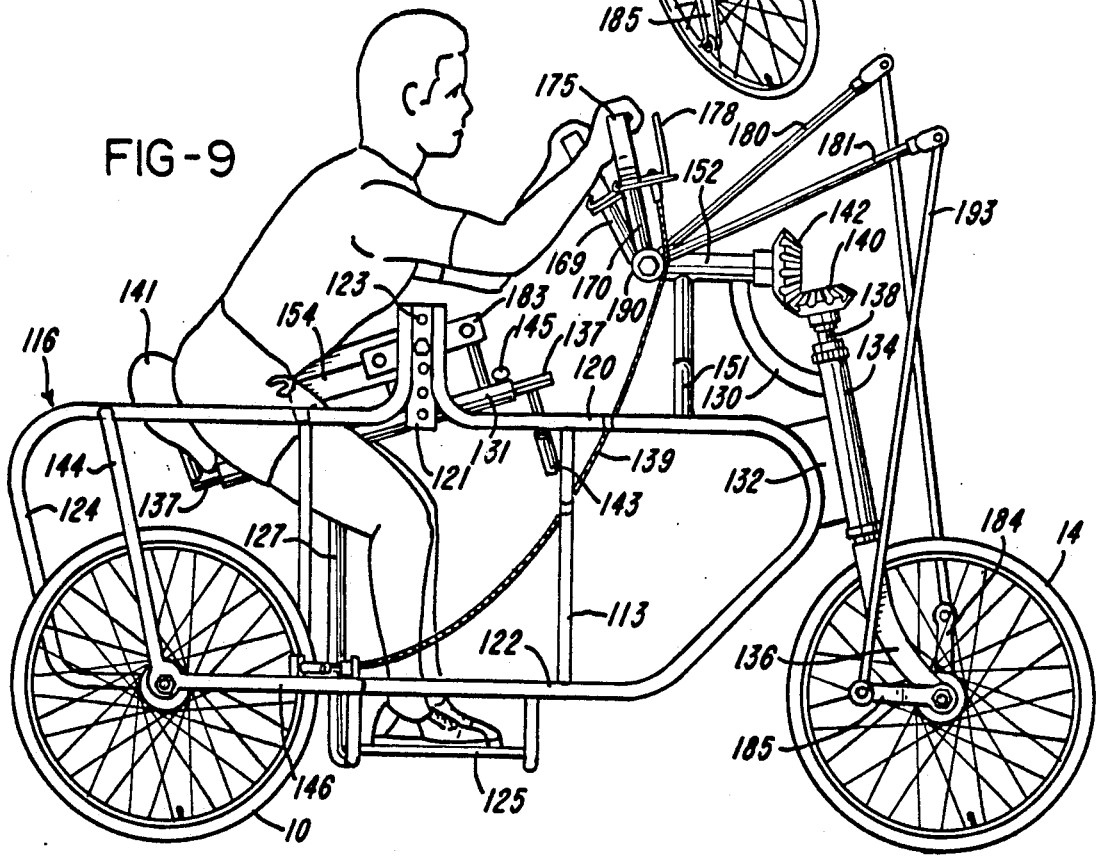

CYCLE APPARATUS HAVING THERAPEUTIC AND UTILITY ASPECTS

This is a division of previously co-pending application Ser. No. 06/618,193 filed on 06/07/84, now U.S. Pat. No. 4,619,462, issued 10/28/86.

BACKGROUND OF THE INVENTION

The present invention relates to means and methods for stimulating, facilitating and inducing the usage of the pedal extremities and/or arms of the human body, basically for purposes of rehabilitation and/or improvement of their function and to encourage and enable greater mobility for the physically impaired. It also provides means for an exercise of the body and/or its limbs contributing to the rehabilitation of its cardio-pulmonary system. Embodiments of this invention are particularly significant in that in use thereof the foregoing objectives or any one or combination thereof can be achieved, as and to the extent required, without excessive exertion on the part of the person using the same. A supplemental and important achievement in the use of the invention embodiments is a contribution to a sense of well being. At the same time certain embodiments of the invention afford a physically and mentally beneficial mode of both recreational and utility transportation. The invention is therefore multi-faceted as to the problems with which it deals and the solutions and benefits which it offers.

The present invention provides an area and manner of treatment of physically and/or mentally handicapped persons which has not, to the inventors knowledge, been previously envisioned on the level or in the context herein set forth. This treatment not only affords an excellent potential for use in rehabilitating limbs and the cardio-pulmonary system, without exceeding medically prescribed stress limitations, but it also inherently provides a relatively safe, exhilarating source of stimulus for instigating mental and physical effort on the part of patients requiring the same for recovery. This is particularly important where the patients have limb disabilities and there can be no hope for their recovery unless they can be induced to take that first step towards use of the limb or limbs in question in spite of a particularly negative attitude. The present invention is uniquely applicable in such case since it can be approached under conditions where there is virtually no stress.

The particular embodiments of the invention herein shown and described are only by way of example and not by way of limitation, either as to the form of their construction or the manner and nature of their application and/or usage.

The inventor is not aware of any prior publication which is specifically pertinent to the points of novelty of the present invention, which are directed to the improvement and the conditioning of the body and its parts as well as the mental uplift of human beings in general, particularly those having difficulty in using their limbs, or any part thereof, or an apparent inability or very limited ability to do so in any respect.

As far as can be determined, the following U.S. Letters Patent well represent the general state of the prior art: U.S. Pat. No. 219,439, to Blend; U.S. Pat. No. 326,247, to Root; U.S. Pat. No. 604,200, to Vogeler; U.S. Pat. No. 1,507,554, to Cooper; U.S. Pat. No. 2,327,671, to Rupprecht; U.S. Pat. No. 3,336,046, to Seiling; U.S. Pat. No. 3,488,088, to Goldbert et al.; U.S. Pat. No. 3,621,819, to Hooper; U.S. Pat. No. 3,759,511, to Zinkin et al.; U.S. Pat. No. 3,877,421, to Brown.

While each of the noted patents suggest to some degree an element of a cycle or support structure, they fail both singly and in combination to provide a concept or construction which per se would anticipate or render obvious the present invention. Most significantly, none of the prior patents reveal the dynamics or the therapeutic construction subject of the present invention.

SUMMARY OF THE INVENTION

The present invention enables and facilitates the design, construction and optimal usage of therapeutic exercising apparatus having multiple practical benefits.

Certain embodiments feature pedicycle apparatus wherein the body of a person is dynamically supported on or in reference to a frame so as to relieve the lower limbs from the normal gravitational load imposed by the upper portion of the body. The net effect is to substantially free the lower limbs, and in particular their pedal extremities, from the compressive and muscular restraints normally experienced in their use.

In one such embodiment of the invention, herein disclosed, by way of illustration, a frame is provided with a three wheeled base in the manner of a tricycle, with two laterally spaced parallel wheels to the rear and the third wheel forward and centered with reference thereto and mounted for rotation on an axle at the lower end of a steering column. The steering column is journalled for rotation about its longitudinal axis in a bearing type bracket at the forward end of the frame. The trunk of the body of the person using the apparatus is dynamically supported, in an attitude appropriate to the objective, to transfer the load thereof to the frame and consequently distribute it therethrough to its base wheels. The load of the body in the first instance is spring balanced in correspondence with its size and weight and so positioned that the feet of the person lightly apply to the underlying ground surface at a location between and appropriately spaced from the forward and rear wheels of the frame base. It has been found that this arrangement of the person's body, with essentially no body load on the lower limbs, mentally stimulates a relatively effortless movement thereof and the result is an extremely easy and highly efficient propulsion of the wheeled frame which in turn reactively induces what is in fact an ambulatory or gentle running movement of the lower limbs and in the process a light sequential and repetitive application of the feet to the underlying ground surface. It is the dynamic support of the body which facilitates and conclusively aids the effective movement and application of the feet to this end. The grip of the ground by the toes and/or soles of the feet need only be minimal to achieve the desired result. The factors involved are supportive of one another and cumulative in their effect.

The ability to fully or even partially use their lower limbs and/or pedal extremities is a tremendous boon to those medically ill and handicapped. At the same time, even a healthy person will find utility and therapeutic cardio-pulmonary benefit as well as an exhilarating sense of well being in use of such an apparatus, due to a relatively weightless feeling.

Both steering and braking are simply and easily controlled by the user of the embodiment just described on a simple incremental manual rotation of a handle bar about a vertical and/or horizontal axis.

This same pedicycle embodiment of the invention can be readily converted to use as a stationary exercising device by chocking its wheels and placing a treadmill belt within the limits of the wheels and in underlying relation to the feet of the user.

A further embodiment of the invention herein contemplated is one designed for use by persons who are either incapable of using or very restricted as to the use of their lower limbs. This embodiment utilizes a frame provided with a three wheeled base and a therapeutic adjustable support for the body and features controls a manual operation of which is required to lend it mobility. In this instance propulsion is effected solely by simple rocking movements of easily grasped and easily manipulated hand grips, the movements of which are translated by a lever system which produces corresponding increments of motion of the lead wheel of the vehicle of which it forms a part. The hand grips are at the same time interrelated with a system of gears to achieve a steering function. Furthermore simple braking controls are provided the operation of which involves a minimal exertion, namely a slight extension and retraction of finger tips of the operator.

As will become readily apparent, and should be understood, certain features of construction of the different embodiments herein set forth and obvious therefrom may be readily interchanged in accordance with the therapeutic benefit desired.

In general, the purposes and uses of the invention embodiments may selectively be, but are not limited to, the following:

a. Rehabilitation of limbs;
b. Rehabilitation of the cardio-pulmonary system;
c. Exercise and/or entertainment with ready control of physical exertion; and
d. Provision of a cycle type vehicle providing an exercise device which can be self propelled by handicapped persons with minimal exertion on their part and maximum safety in its use.

It is therefore, a primary object of the present invention to provide improved means and methods for use in the rehabilitation of the limbs of physically disadvantaged persons.

Another object is to provide simple and effective means for contributing to the rehabilitation or maintenance of a person's cardio-pulmonary system.

A further object is to provide new and improved cycle type exercising and utility apparatus which is economical to fabricate, more efficient and satisfactory in use, adaptable to a wide variety of applications and unlikely to malfunction.

An additional object is to provide a pedicycle apparatus wherein the operator is dynamically supported and/or suspended so as to relieve the lower limbs of the weight of the person's body, facilitating the use of such lower limbs freely and easily to achieve a high degree of propulsive effect with a relatively minimal amount of physical exertion.

A further object is to provide a new and improved cycle type exercising structure embodying handlebar operated propulsion and steering mechanism as well as a brake control the operation of which may be achieved with minimal physical exertion, facilitating rehabilitation of the cardio-pulmonary system by means of upper extremity and torso exertion without exceeding medically prescribed stress limitations and at the same time providing self-propelled mobility for those with impaired lower limbs or those who have had single or double lower limb amputation.

Another object is to provide an improved braking system for cycle type vehicles.

A still further object is to provide a new and improved propulsion system for cycle type vehicles which has general application but is particularly advantageous for use by handicapped persons.

Another object is to provide apparatus having the conceptual aspects, the inherent structural characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawing wherein are shown some but not the only forms of embodiment of the present invention, FIG. 1 is a perspective view of a pedicycle representing one embodiment of the present invention;

FIG. 3 is a view which is fragmentary in nature, enlarged and partly in section to show detail of the construction and mount of the support for the occupant of the embodiment of FIG. 1;

FIG. 4 is a sectional view taken on line 4—4 of FIG. 3;

FIG. 5 is a sectional view taken on line 5—5 of FIG. 3;

Figure 6:
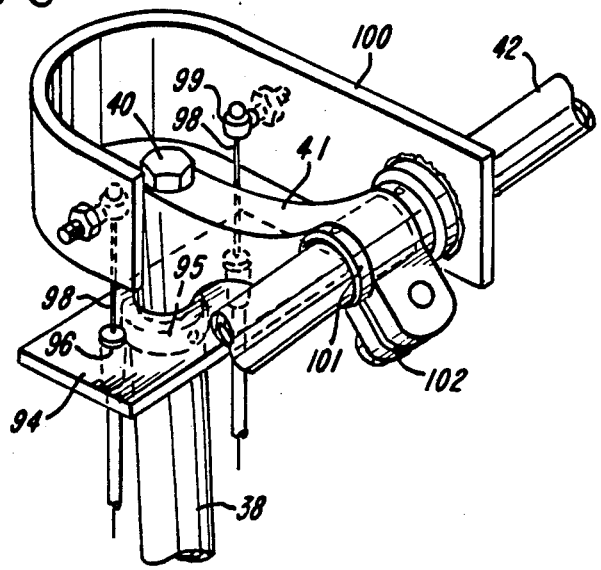
Figure 7:
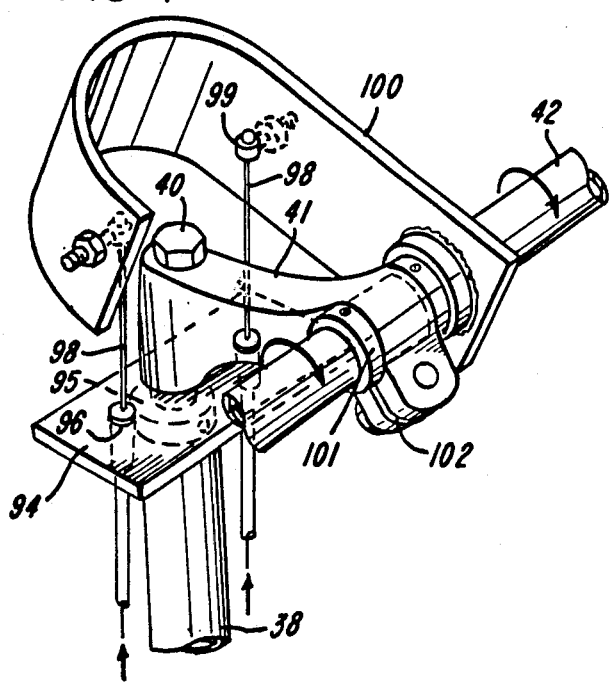
Figure 10:
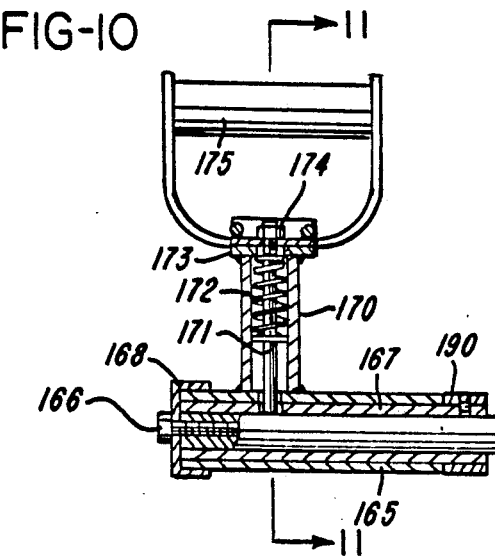
Figure 11:
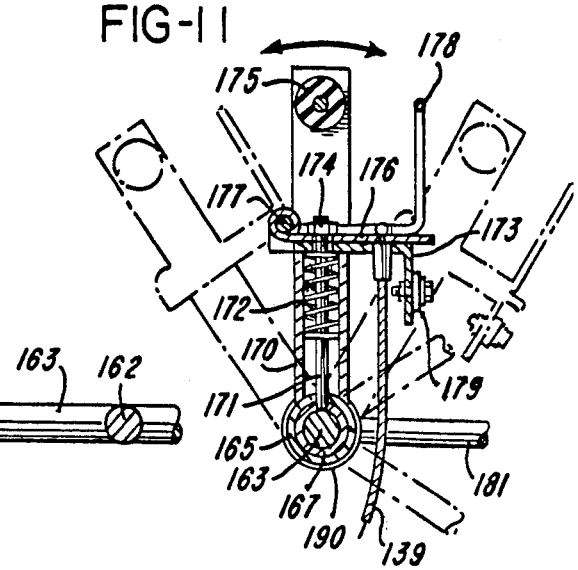
Figure 12:
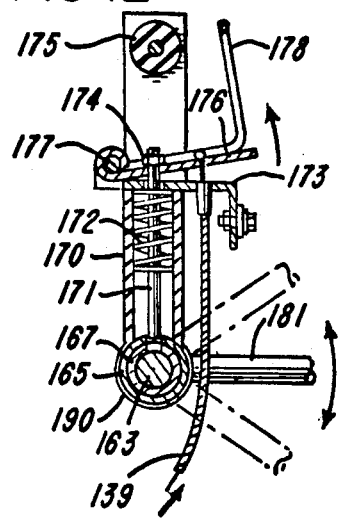
Figure 13:
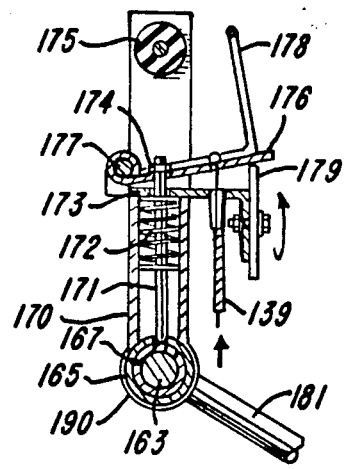
Figure 14:
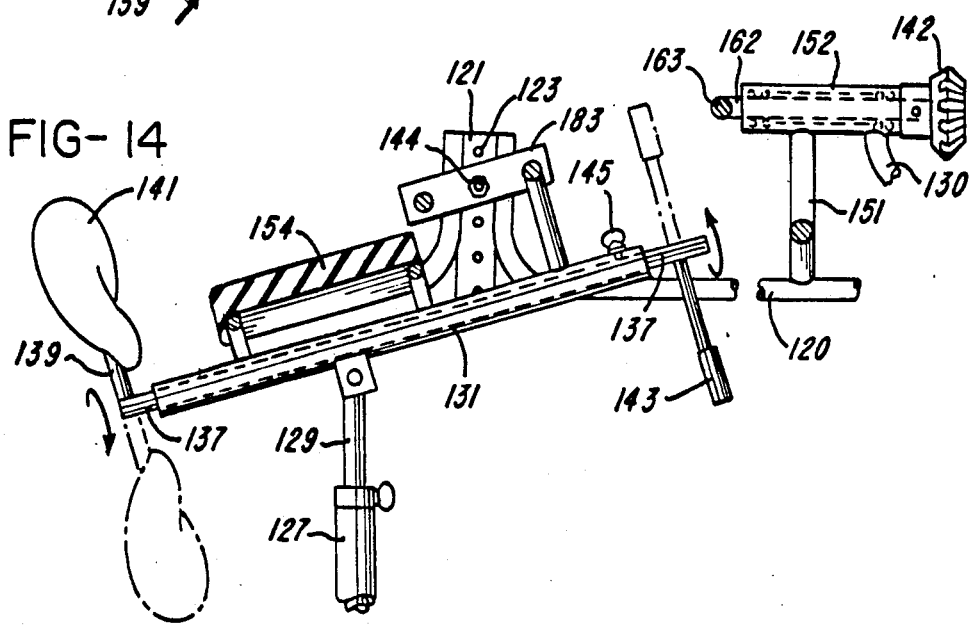

FIG. 6 demonstrates details of the brake control;

FIG. 7 demonstrates the brake control of FIG. 3 in the process of inducing a braking function;

FIG. 8 is a perspective view illustrating a second cycle type apparatus constituting a further embodiment of the invention;

FIG. 9 is a side elevation view of the cycle of FIG. 8, in use;

FIG. 10 is a fragmentary view of a portion of the control structure utilized in the apparatus of FIG. 8, shown partially in section and enlarged to illustrate pertinent detail;

FIG. 11 is a view taken on line 11—11 of FIG. 10;

FIG. 12 is a view similar to that of FIG. 11 illustrating a position of the brake control mechanism enabling a free wheeling condition of the cycle;

FIG. 13 is a view similar to that of FIG. 12 except that it illustrates the brake control in a locked condition;

FIG. 14 is a fragmentary view of the apparatus of FIG. 9, shown partly in section, illustrating pertinent detail of its control structure including that related to the support for the operator of the illustrated vehicle.

The pedicycle of FIGS. 1-4 comprises a base of three bicycle type wheels 10, 12 and 14 triangularly positioned in the manner of the wheels of a tricycle, the wheels 10 and 12 being its rear wheels and the wheel 14 its forward wheel. These wheels are connected with and in supporting relation to a three sided frame structure 16 serving as a chassis within which is mounted a "seat" 18 for the operator of the pedicycle.

The frame 16 is an elongate rigid structure formed of two identical laterally aligned continuous loops of metal tubing 19, bent and joined together to define the sides and front end of a three sided protective enclosure. Free access to this enclosure is afforded through its read end, at the respective sides of which are the wheels 12 and 14, connected in a supporting relation thereto.

The loops of tubing 19 are each comprised of an upper section 20 and a lower section 22 which in the application of the loops to form the chassis 16 define its upper and lower limits and the longitudinal extent of its sides. The upper sections 20 are in a common horizontal plane as are the lower sections 22.

As the sections 22 extend forwardly from their rearmost ends, they are first parallel, for a short distance along their length (these parallel portions each being identified by the numeral 23), then briefly inclined inwardly towards each other in a forwardly convergent fashion, following which they uniformly and gradually converge to their forward ends, which are laterally spaced. The sections 20 are somewhat shorter in length than the sections 22 and, in a longitudinal sense, positioned within the limits thereof, intermediately of and spaced from their respective ends. At the same time the sections 20, which have a straight line configuration throughout their length, are maintained in a laterally spaced relation as they slightly converge from their rear to their forward ends.

The rear ends of the sections 20 and 22 of each loop 18 smoothly merge with and are joined by a section 24 thereof, while their forward ends are joined by a section 28.

The lower portion of the section 24 rises vertically upward from and perpendicular to the rear end of the rear portion 23 of the section 22 which forms its base, for a distance which corresponds to about one third its length. From this point the section 24 curves upwardly and forwardly to overlie a short distance along the length of the portion 23 and then angle laterally and upwardly to join to the rear end of the section 20 of the loop of which it forms a part. At the forward end of its extent which overlies a part of the rear end portion 23 of the section 22, the section 24 is welded to the upper end of a tube section 26 which rises from and perpendicular to the portion 23. The lower end of the tube section 26 is welded to the portion 23 at a point adjacent and in a relatively closed spaced relation to its rearmost end.

Between their vertical extremities the forward sections 28 of the loops 19 are projected outwardly and forwardly of the ends of the sections 20 and 22 to which they respectively connect and with which they smoothly merge. When viewed in profile in FIG. 1, it will be seen that the forward limit of each section 28 is defined by a projected apex portion 29 the outer limit of which defines a flat which is relatively vertically oriented. In the example illustrated, the apex portions 29 are located slightly below the center of the vertical extent of the sections 28. Furthermore, as the sections 28 are projected beyond the sections 20 and 22, they are caused to converge to the point that their apex portions 29 are brought together in a plane which bisects the frame 16. At the point where the apex portions 29 are brought together they are joined to each other and to the rearmost edge of a small web plate 32 by welding. As so fixed, the plate 32 is disposed in the aforementioned vertical plane and its forward edge, which is angled to incline upwardly and rearwardly from a vertical, is welded to a short tubular element 34, by virtue of which the element 34 is similarly inclined to provide a steering head for the frame 16 each of the respective ends of which fixedly contains a bearing assembly (not shown). A bicycle fork 36 is conventionally arranged to have its tubular upper end portion project into the head 34, by way of the bearing at its lower end, to extend through the bearing and upwardly of the head for a substantial portion of its longitudinal extent. At the same time the lower bifurcated portion of the fork 36 is positioned immediately below the head 34 to depend downwardly therefrom in a direct coaxial alignment therewith to a point immediately adjacent its lower end, from which point the bifurcated portion is bent forwardly and downwardly in a smooth curved configuration. At the forwardmost limit of this curve, which corresponds to the lowermost end of the fork 36, the bifurcated part of the fork is bridged by a releasably fixed axle which projects through the tubular hub of the wheel 14 and thereby mounts the wheel for rotation thereon and relative thereto. As will be seen, the wheel 14 is thereby positioned in a laterally centered spaced relation with respect to the laterally spaced dependent portions of the bifurcated part of the fork. A tubular stem 38 has one diametrically slit end portion telescopically applied to and within the upper end portion of the fork 36 and it is clamped and fixed thereto on the drawing therein of a wedge which is threadedly engaged by and under the control of the stem expanding bolt 40. As so interconnected therewith, the stem 38 forms an upward extension of the fork 36 as it projects to and through the bearing in the upper end of the head 34 and, to a limited extent, outwardly thereof. The uppermost end of the stem 38 is capped and vertically extended, to a modest degree, by one end of a short outwardly and generally radially directed steering arm 41 which serves to mount thereto the handlebar 42. Attention is directed to the fact that the means and method by which the stem assembly is applied within the head 34 and interconnected with the upper end portion of the fork 36, as well as the manner of the mount of the wheel 14 to the lower end of the fork 36 and the means and method by which the fork and the stem assembly are restrained from relative axial displacement with reference to the head 34 are conventional and well known by mechanics versed in the art. Therefore the details thereof have been limited and set forth only to the extent necessary for an understanding of the present invention.

However, it will be seen that there has been some modificaton of the stem and the handlebar assembly for purposes of and in accordance with the present invention. Such will be hereinafter described.

At each side of the frame 16, a short length of metal tubing 44 has one end thereof joined by welding to the outermost side of the tube section 26, at a point adjacent and spaced from its uppermost end. The tubing 44 is formed with a 90° bend to provide that a short portion of its length projects laterally of the frame 16, outwardly from and perpendicular to the tube section 26. The remainder of the tubing 44 depends vertically, in a parallel outwardly spaced relation to the tube section 26, to position its opposite end in the horizontal plane occupied by the sections 22 of the loops 19, where it is welded to the rear end of a further length of tubing 46. The latter is co-planar with the sections 22 and so formed as to first extend forwardly of the lower end of the tubing 44, at a right angle thereto and in a parallel spaced relation to the rear end portion 23 of the section 22 of the adjacent loop. Where the tubing 46 reaches a point laterally aligned with the forward limit of this portion 23, the remainder thereof, which is of appropriate length, is bent at a 90° angle to have its projected extremity joined thereto by a weld. A transverse aperture in the rear end of the tubing 46 adjacent the tube section 44 is coaxially aligned with a similar aperture in the portion 23 of the adjacent section 22.

At each side of the frame 16, the tube sections 26, 44 and 46 define a frame, open at its bottom and to its rear, within which the forward upper quadrant of the wheel 10 or 12, as the case may be, is inserted, to coaxially align its tubular hub with aligned apertures provided in the tube section 46 and the adjacent tube portion 23. A conventional axle applied through the aligned apertures and within the hub of the wheel therebetween, and suitably fixed with reference to the tube section 46 and the adjacent tube portion 23, mounts the wheel for free rotation thereon and relative thereto.

The frame 16 is thereby stably mounted on and rendered mobile by the triangularly positioned wheels 10, 12 and 14.

The loop 19 at each side of the frame 16 has in connection therewith, and within the bounds thereof, a length of rigid metal tubing 48 which has a straight line configuration. One end of the length of tubing 48 is welded to the forward end of the section 22 and its opposite end is welded to the section 20 of the loop of which it forms a part at a point adjacent to but spaced to the rear of the midpoint of its length. Each loop 19 also incorporates a shorter length of rigid tubing 50 having a straight line configuration one end of which is welded to the length of tubing 48 adjacent and spaced below the midpoint of its length and the opposite end of which is welded to the interconnected section 22 at a point slightly forward of the midpoint of its length.

Figure 1:
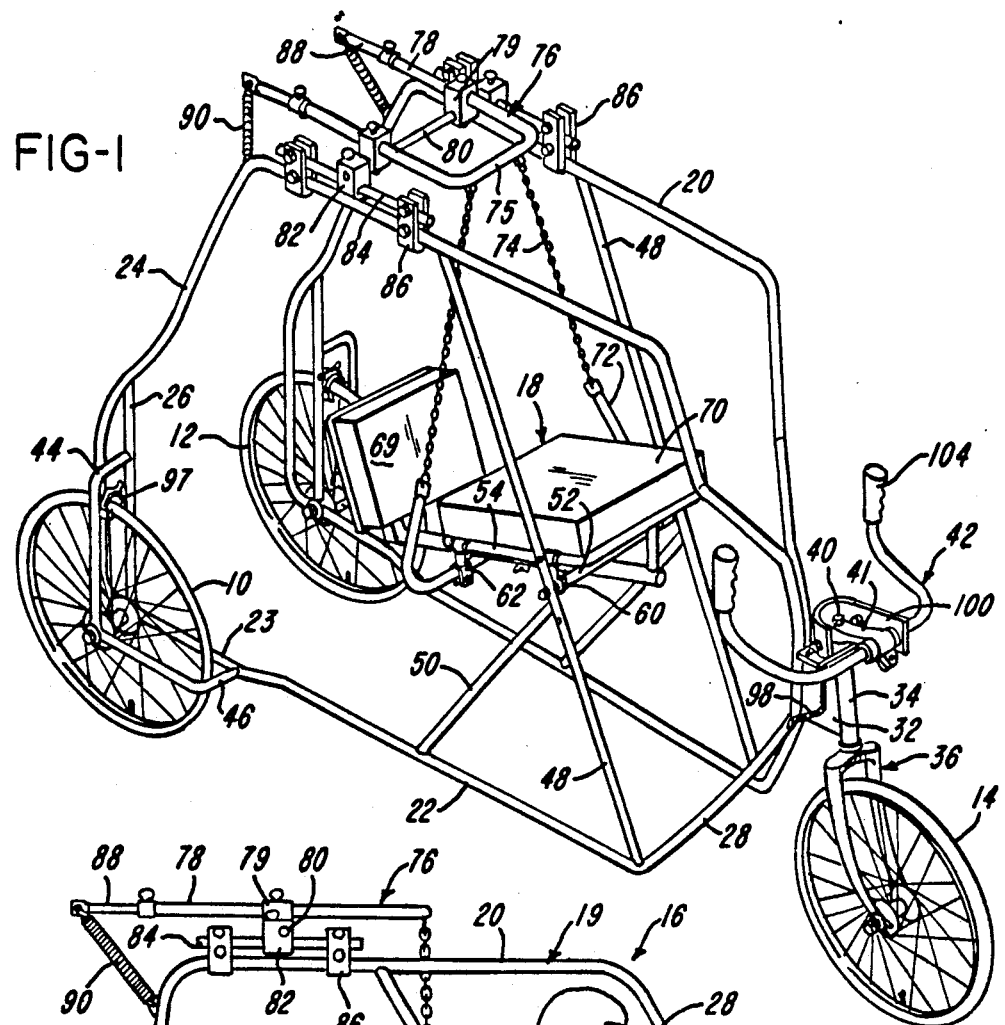
Figure 2:
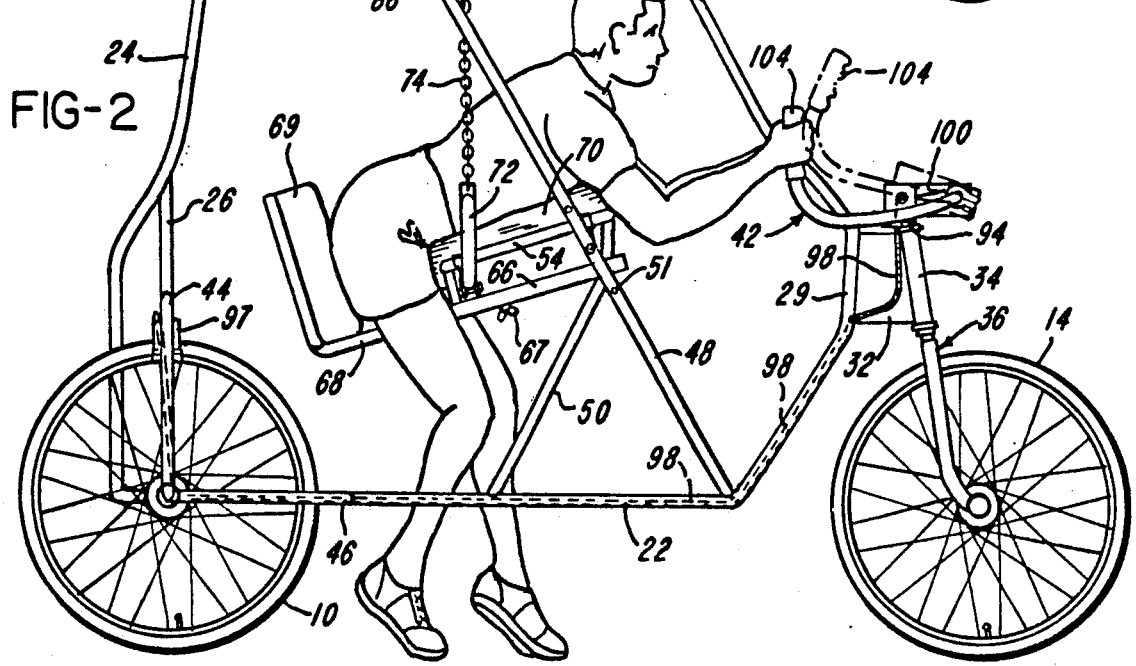
FIG. 2 is a side elevation view thereof, shown in use.

As will be seen from FIGS. 1 and 2 of the drawings, the lengths of tubing 48 and 50 of each loop are not only relatively inclined but they are so inclined and attached to the loop 19 to which they apply as to produce a reinforcement thereof. Furthermore, the lengths of tubing 48 at the opposite sides of the frame 16 have coaxially aligned apertures 51 adapted to be bridged by a horizontally oriented pivot rod 52 located at a level adjacent to and spaced above that of the points at which they are joined to the upper ends of the lengths of tubing 50. The rod 52 serves to mount thereon, and in pivotal relation thereto, the forward end of the "seat" 18, in such a manner that it is securely connected to and stably supported on the frame 16. Note that the members 48 have a series of longitudinally spaced apertures 51 to enable that the pivotal connection of the "seat" 18 may be raised or lowered, depending on its use.

The "seat" 18 comprises a generally rectangular frame 54 made of rigid metal tubing.

Each of the longitudinally extending sides of the frame 54 has a pair of bearing elements, respectively 60 and 62, connected thereto and dependent therefrom in a longitudinally spaced relation. The element 60 is a transversely oriented sleeve located adjacent and spaced from the forward end of the frame 54. The element 62 which is also transversely oriented is located adjacent to and spaced forwardly of the rear end of the frame 54. The element 62, moreover, has an inverted "U" shape, the legs of which are dependent and interconnected by an applied bolt and nut adjacent their lower ends, to form therewith a loop which can be expanded or contracted as needs require. The elements 60 and 62 dependent from each side of the frame 54 are identically positioned under and in a closely spaced relation to the undersurface of that side portion from which they depend. The elements 60 are thereby established in a transversely spaced coaxial relation, as are the elements 62.

In the mount thereof to the frame 16, the forward end of the frame 54 is projected between the tube members 48 and slightly beyond in order to place the sleeve members 60 in a coaxial alignment with the apertures 51 to commonly therewith receive therethrough the rod 52 the ends of which are releasably fixed to the respective members 48 by bolts.

Integrally connected with and dependent from the undersurface of the frame 54, to either end thereof and in a laterally centered relation with respect to its sides, are short sections of tubing which are welded at their lower ends to longitudinally spaced portions of a tube 66. The tube 66 underlies the frame 54 in a parallel spaced relation thereto and projects, to a limited extent, rearwardly thereof. A smaller diameter tube 68 has one end thereof telescopically applied to and within the rear end of the tube 66 and fixed thereto by a set screw 67. For a short distance along its length the tube 68 provides a direct rearward extension of the tube 66 to the point where its rear end portion is bent upwardly to produce therein a 90° curve and to mount at the front thereof a backing support for a foam filled cushion 69 which is in an adjacent spaced relation to the rear end of the frame 54. The frame 54 also mounts in connection therewith and in overlying relation to its upper surface a further foam filled cushion 70 which is formed to overlie its sides and depend over its rear end, in a directly opposite spaced relation to the cushion 69. As will be obvious the spacing between the rear end portion of the cushion 70 and the cushion 69 can be readily adjusted on a release of and a resetting of the tube 68 with respect to the tube 66.

The bearing elements 62 which are located at a level between and spaced from the frame 54 and the underlying tube 66 receive therein, in bearing relation thereto, a central portion of the length of a tube element 72. The opposite end portions of the tube 72, which are equal in length, symmetrically project outwardly beyond the sides of the frame 54, to a limited extent, and are then bent upwardly and inwardly in convergent fashion to terminate a short distance above the cushion 70, closely adjacent to but outwardly of its respective sides.

Each of the end portions of the tube 72 is flattened and provided with a central aperture in which is hooked one end of a chain 74. The two chains 74 extend upwardly of the element 72 in a slightly convergent fashion to have their upper ends respectively anchored to hook-type attachments integrated with and projected from the lateral extremities of the bridging base portion 75 of an elongate U-shaped rod member 76 (FIGS. 1 and 2). In the example of FIG. 2, the member 76 is mounted in a plane spaced above and parallel to the plane of the upper sections 20 of the loops 19, with its bridging portion located, approximately, directly above the midpoint of their length. The elongate leg portions 78 of the member 76 are projected rearwardly of its base, to and through bores of laterally spaced block elements 79, in bearing relation thereto. The blocks 79 are themselves mounted on and in bearing relation to a pivot rod 80 which projects through bores in the blocks 79 to have its respective extremities dispose in bores provided in blocks 82. The blocks 82 respectively position above the sections 20 to either side of the frame 16. Each of the blocks 82 have a bore through the lower portion of their vertical extent, through which bore is projected a rod 84 the respective ends of which are secured in clamps 86 positioned in longitudinally spaced relation in connection with a rear end portion of the tube section 20 of the loop 19 to which they apply. The arrangement is such that the rods 84 are positioned immediately above and in spaced parallel relation to the portion of the section 20 thereunder. At the same time the rods 84 accommodate an adjustment of the blocks 82 along the length thereof to that position which is required, in any particular instance for the setting of the rod 80 and the blocks 79 which mount thereon. The rear ends of the leg members 78 of the U-shaped member 76 are extended by telescopically applied tubular elements 88. The rearmost ends of the elements 88 are flattened and incorporate apertures to each of which is connected one end of a coiled tension spring 90, the opposite end of which is angled forwardly and downwardly to interconnect with an eyelet-shaped attachment integrated with the adjacent section 24 of the loop 19 to which the spring is applied. As shown in FIG. 2, the springs 90 which respectively apply to the rearmost extremities of the extensions 88 of the leg members 78, by virtue of their lateral interconnection with the sections 24 of the frame 16, adjacent their uppermost ends, establish a force on the rear end of the assembly 78, 88 to pivot the same, together with the blocks 79 to which they apply to establish a desired orientation thereof and create a dynamically balancing force which establishes a desired inclination of the "seat" 18 under the influence of the support thereof through the medium of the tube element 72 and the interconnected chains 74.

As should be readily apparent, a set screw applied to each of the blocks 79 may be turned inwardly thereof to engage and fix the position of the U-shaped member 76 with respect thereto. Similarly, the elements 88 may be fixed in a position to provide any desired projection thereof from the leg members 78, within their limits, also by means of the application thereto of a set screw. The same applies in reference to the blocks 82 which may be fixed in a selected position of adjustment along the rods 84 by means of set screws.

The adjustment of the assembly 78, 88 forwardly or rearwardly with reference to the blocks 79 as well as the positioning of the blocks 82 along the rods 84 will depend upon the weight of the body portion of the pedicycle operator which is applied on and to the seat 18 and in accordance with the length of the lower limbs of the operator which depend from the "seat". As will be evident, the arrangement, with particular reference to blocks 82, provides a spring actuated lever (member 76) and a movable fulcrum (blocks 82) therefor.

Considering further the stem and handlebar assembly, as seen in FIGS. 1, 2, 6 and 7, the upper end portion of the stem 38 projects through a central aperture in a rectangular plate 94. This aperture is rimmed by a collar 95 connected to form an integral part of the plate. It is through a tapped radial aperture in this collar that a set screw is applied to fix the plate 94 to the stem 38 immediately above that point at which it exits from the upper end of the steering head 34. The plate 94 further includes a pair of small diameter apertures 96, positioned to opposite sides of, radially spaced from and outwardly of both the head 34 and the stem 38.

A conventional bicycle brake 97 is mounted to each of the tube sections 26 at each of the opposite outer sides of the frame 16, immediately below the upper end of the interconnected tube section 44. The brakes 97 are respectively arranged for application to the rims of the wheels 10 and 12. Each brake has a control cable 98 interconnected therewith. Each cable 98 is arranged to extend into and through the section 22 of the adjacent loop of tubing 19 to its forward end and then upwardly through the lower end portion of the following section 28 to exit therefrom by way of an aperture at the lower extremity of its apex portion 29. Each cable then extends upwardly to and through the aperture 96 in the plate 94 which is most adjacent thereto. The cables 98 have their uppermost ends respectively anchored to fittings 99 secured in connection with diametrically opposite inner surface portions of the curved end of a J-shaped bar 100 which normally cups the inner end of the arm 41, in a concentric spaced relation thereto. The remote end of the bar 100 is anchored to the handlebar 42, by welding, immediately to the left of the projected end portion of the arm 41, a collar 101 applied about and fixed to the handlebar by a set screw being positioned therebetween. A second collar 101 is similarly applied to the handlebar immediately to the right of the outer end portion of the arm 41 (as viewed by the occupant of the "seat" 18). As so arranged, the collars 101 preclude lateral movement of the handlebar.

The projected end portion of the arm 41 is conventionally constructed to serve as a clamp. To this end a slit 102 directed inwardly of its projected extremity, in a plane parallel to its upper and lower surfaces, is expanded to form a bore at its innermost end. It is in this bore, which extends transversely of and opens from the sides of the arm, that the central portion of the handlebar is positioned in the assembly thereof to the arm.

In the embodiment of the invention shown in FIGS. 1-4, a split friction bearing (not shown) is applied to and about the central portion of the handlebar prior to its assembly. For purposes of its assembly the upper and lower parts of the outer end portion of the arm 41, as defined by the slit therein, are spread sufficiently to receive therein the central portion of the handlebar with said friction bearing applied thereto. The handlebar and the bearing are then pushed inwardly of the slit until they mutually seat within the bore at its inner end. In the process of this assembly, the previously applied collars 101 respectively position to the sides of and in essentially bearing relation to the arm 41. This insures against the lateral shifting of the handlebar with respect thereto. The superposed portions of the outer end of the arm 41, immediately beyond the bore, are interconnected by a conventionally applied bolt which is then adjusted to clamp the friction bearing about the central portion of the handlebar in a manner to effect a frictional connection therebetween as well as a frictional connection between the bearing and the wall which bounds the bore. The degree of application of friction is made such that the handlebar will be maintained in the original position to which it is set under normal circumstances. Under such normal circumstances the grip portions 104 at the extremities of the handlebar will in the present instance project upwardly in an essentially vertical orientation. As will be seen, an occupant of the seat 18 can manually grip the handlebar portions 104 to achieve whatever steering is required in a simple and effortless fashion. At the same time, merely by applying a forward force on one or both of the grip portions, the occupant can induce a limited degree of rotation of the handlebar in a forward direction in the process of which the interconnected J-shaped bar rotates therewith and induces a leveraged tensioning of the brake cables 98, whereby to quickly and effectively operate the brakes 97 to induce thereby a closing thereof on the rims of the wheels 10 and 12, respectively. The arrangement here provided for control of braking is significantly effective to convert a relatively limited exertion on the part of the operator of the pedicycle into a substantial mechanical advantage which insures full braking as and when required. Due to the limited forward rotation of the grips 104 required for braking, on release thereof the extensioned brake cables will per se be effective to restore the handlebar to its originally set position.

Attention is directed to the fact that the features of the above described braking system and its obvious benefits makes it per se highly advantageous for general application to a great variety of cycle type vehicles, independently of its significance and advantage in such embodiments of the invention as herein described.

The foregoing description is referenced to a preferred embodiment of the invention such as set forth in FIGS. 1-4 of the drawings.

Attention is drawn to the fact that, while less preferred, a dynamic balance of the seat 18 and the body of an occupant thereof may be achieved through the medium of a biasing influence imposed on the forward extremity of the frame 54 rather than on its rear. To this end a device such as the member 76 may be adjustably mounted to the underside of the frame 54 to selectively project forwardly thereof. In such event a pair of spring elements, such as the springs 90, will have their one ends anchored to the forward extremity of the member 76, in a laterally spaced relation, and their opposite ends anchored to portions of the sides of the frame 16 below and to the rear thereof. The construction and arrangement of the parts, in such case, is believed obvious.

The pedicycle of FIGS. 1-4 can be effectively used by any person to good advantage as noted previously. However, the availability of the same is particularly advantageous to those who are handicapped either by reason of a debilitation of or an injury to the lower limbs, or one thereof. The same applies to those persons disabled or disadvantaged by cardio-pulmonary problems. In either case, a means for stimulating or creating a potential of rehabilitation of such patients with minimal exertion on inception of a program to this effect answers a long felt need in the field of therapy. This is what in fact is provided by the present invention.

As will be seen from FIG. 2, for use of the embodiment of the invention there shown the legs of the person to be exercised will be caused to straddle the tube 68 immediately to the rear of the frame 54 as the body is inclined forwardly over the cushion 70 to rest the abdomen and lower chest portion thereof thereon. This procedure is facilitated by the open nature of the frame 16 and, where required, a temporary release of the set screw 67 to enable a 180° rotation of the tube 68 and the backing portion of the seat 18 at its rear end. This adjusted position of the rear end of the seat may be temporarily fixed by appropriate setting of the screw 67 until the body is positioned as described. At that point the set screw may be once more released and the tube 18 and its interconnected backing structure returned to its normal position for use thereof. Attention is directed to the fact that with the seat and all its parts in place for use and a person mounted as described the cushion 69, as backed by its support, will set in backing abutted relation to the buttocks and in underlying relation to the hips. At the same time the spacing between the cushion 69 and the assembly of the frame 54 and cushion 70 will be such that the upper forward portion of the thighs of the person will be between the two cushions and thereby protected in a manner believed obvious.

If not previously set, suitable adjustments are then made to so position the member 76 as to insure that the springs 90 function to maintain a dynamic balance of the trunk of the body so as to leave the dependent limbs free of any load thereon from the body per se and so elevated with reference to a ground level that only limited portions of the toes and/or the undersurface of the feet will in any case come into contact with the immediately underlying ground surface. This insures that essentially the full weight of the body is supported by the frame 16 and correspondingly by its base wheels 10, 12 and 14 which render the frame mobile at all times absent a braking of its wheels. Of course the extent and degree of contact of the feet can be varied as desired but in any case the legs will be kept essentially free of body load. The net result is to enable the lower limbs to swing in pendulum fashion and in a manner to resemble a stride, with an absolutely minimal exertion required on the part of the person or a minimal impulse being applied to these limbs. As will be seen, in each swinging movement of a limb or limbs no more than a tip portion of a foot need come into contact with the ground surface in order to induce a movement of the pedicycle, since it is a free wheeling vehicle. At the same time, the hands of the person mounted on the seat 18 will grasp the grips 104 of the handlebar, not only giving a sense of stability and control to the person but a ready ability to steer and in fact brake the rear wheels with a minimal exertion in this respect also. The whole effect on the person using the pedicycle is a sense that his or her body is extremely light in weight, essentially floating and stably balanced. The most significant psychological aspect of the condition of the person is that when he or she finds that only a very minimal impulse or exertion is required to induce a swinging of the lower limbs, effort will be made in this respect and as a foot comes into contact with underlying ground surface with a resultant unexpected propulsive effect with respect to the pedicycle, this enhances the confidence and satisfaction of the person being exercised.

This psychological reaction is extremely important in that it induces a feeling that rehabilitation of the limbs is possible, to which the body will inherently and reactively respond to good effect. It is found in use of the pedicycle that it takes very little to induce a feeling of ambulating or running. This is a significant step towards giving the person being exercised a will to go forward. The apparatus can be used in the same context in dealing with the recovery of a paraplegic. It is not unlikely, in any case, that the effect of this exercising procedure can enhance the healing process requried through improvement of circulation, kinesthesia development and accelerated stimulation of neuritization. As the use of the pedicycle is advanced, the upwardly inclined angle of the portion 54, 70 of the seat may be increased and the feet brought into greater contact with the underlying ground surface. The end result on the part of a person subjected to this exercise will be more than physical improvement, it will be a realization that the pedicycle itself is a most convenient vehicle which can give exercise to the body with cardio-pulmonary benefits. It will also be found that when one is using the pedicycle one can travel quite rapidly, with little effort, over an extended distance in a relatively short period of time.

As should be self-apparent, the hand manipulation and extension of the arms required for steering and braking as propulsion is increased also have obvious beneficial therapeutic consequences.

It is noted that the pedicycle represents a safe, pleasing method of exercise for post-coronary patients that may give more comfort and satisfaction to such patients that regular walking or stationary exercise.

As has been mentioned also, the use of the pedicylce is an exhilarating experience which may be likened to gliding through space (kinesthesia) quite similar to walking on the moon. A side benefit in its use is that a person can travel a considerable distance with ease and little expended energy and at the same time provide an attachment which will enable the pedicycle to carry loads. The pedicycle may even be utilized in an industrial environment as the utility vehicle adapted for transport of loads by means of one operator who can induce propulsion thereof with a minimal of effort and certainly without the expense normally entailed for the use of fuel.

The embodiment of FIGS. 8–14 comprises two identical loops of tubing 119 joined to form the sides and front end of a frame 116 defining a chassis for a cycle-type apparatus which is based on three bicycle wheels 10, 12 and 14. The connection, mount and disposal of said wheels is essentially the same as that previously described with reference to the embodiment of FIGS. 1–7.

In this instance the length of each loop 119 comprises a portion 120 to serve as its upper limit and a portion 122, which is in a spaced, substantially parallel relation to the portion 120, to serve as its lower limit. The portions 120 and 122 are joined at what constitute their rear ends in use by a portion 124 which forms an included angle of about 110° with the portion 122 and a complementary angle with the portion 120, to which it is interconnected by an arcuate extension thereof. The opposite or forward ends of portions 120 and 122 are joined by a portion 128 which at one end thereof forms an included angle of about 135° with the portion 122 and extends therefrom in a straight line for a major portion of its length, following which it is then curved inwardly and upwardly on a uniform radius to have its projected extremity merge with the end of the portion 120 to which it connects. Interposed in the portion 120 of the loop 119, at a location centered between its ends, is an upwardly vertically directed narrow plate 121 embodying therein a series of vertically aligned, vertically spaced apertures 123.

The sides of the frame 116 are defined by the limits of the upper, rear and lower portions of the loops 119. Its front end is defined by the limits of the loop portions 128 which converge as they project forwardly of its sides to have their projected arcuate extremities position in a side-by-side abutted relation in a vertical plane which is parallel to the sides of and bisects the frame 116. At this point the projected extremities of the portions 128 are joined to each other and to the rearmost edge of a small complementarily configured web plate 132 which is thereby disposed in the aforementioned vertical plane. The forwardly projected edge of the plate 132 mounts a short tubular post so it inclines upwardly and rearwardly from a vertical to provide a steering head for the frame 116 each of the respective ends of which has nested therein and fixedly related thereto a bearing assembly (not shown).

A bicycle fork 136 is arranged to have its tubular upper end portion project into and upwardly of the head 134 by way of the lower bearing therein and to have, as well, an extension 138 thereof project upwardly and outwardly of the upper end of the head 134. A bevel gear 140 is mounted about and in connection with the projected extremity of the extension 138. Conventional means are utilized to prevent a relative axial movement of the tubular upper end portion of the fork 136 and the head 134. At the same time, the lower bifurcated portion of the fork has the upper end thereof positioned immediately below the head and its laterally spaced parts dependent to either side of an upper portion of the wheel 14 to align coaxial apertures therein with the tubular hub of the wheel and accommodate the projection therethrough and in bearing relation thereto of the respective ends of an axle lodged within and in connection with the hub. By such means the wheel 14 is mounted for rotation on and relative to the fork 136. This establishes the front end of the frame 116 in an elevated relation to the underlying ground surface.

A length of metal tubing 144 applied to each of the remote outer sides of the frame 116 has one end portion thereof connected with and projected outwardly from and substantially perpendicular to the upper portion 120 of the length of a loop 119 at a point adjacent and in closely spaced relation to its rear end. The remainder of the length of tubing 144 is bent to extend downwardly in a straight line which is parallel to both the plane of the adjacent loop and the straight line part of its rear portion 124. In each case the lower end of the tubing 144 is connected to form a joint with the rear end of a further length of tubing 146 which extends forwardly in the plane of the portions 122 of the frame 116 and parallel to the portion 122 of the adjacent loop. The forward end portion of the length of tubing 146 is bent inwardly at substantially a 90° angle to have its projected extremity end abutted and welded to the adjacent loop portion 122. An aperture directed through and transversely of the joint between the tubing 144 and 146 is coaxial with a similar aperture in the adjacent loop portion 122. At each side of the frame 116, the tube sections 144 and 146 together with the adjacent tube portion 122 define a frame which is open to its bottom and to its rear and formed to accommodate, freely, the forward upper quadrant of the wheel 10 or 12, as the case may be, to have the tubular hub of the wheel coaxially aligned with the aperture in the joint between the tubes 144 and 146 and the aperture in the adjacent loop portion 122. An axle is conventionally applied through the aligned apertures and the hub of the wheel which is positioned therebetween and suitably fixed to provide for a mount of the wheel for free rotation thereon and relative thereto. The wheels 10 and 12, so applied, support the rear end of the frame 116 in a spaced elevated relation to the underlying ground surface. The frame 116 is thereby stably mounted on and rendered mobile by the interconnected wheels 10, 12 and 14. The arrangement is such to establish the lower loop portions 122 in a horizontal plane. Immediately forward of the rear wheels 10 and 12 the lower portions 122 of the loops 119 are transversely bridged by a pair of shallow, laterally expanded, relatively dependent U-shaped bars which are longitudinally spaced. The upper ends of these bars are welded to the portions 122 and the lower base portions thereof are bridged by a superposed, interconnected foot plate 125 which defines a footrest. Immediately to the rear and immediately forward of the location of the plate 125, each loop 119 is identically reinforced by a vertically oriented rod 113 extending between and having the ends thereof respectively connected to its upper and lower portions 120 and 122.

Attention is directed to the fact that the upper level of the portions 120 of the loops 119 is in this case approximately waist high as related to the body of an average person.

A tubular post 127, one end of which is anchored to the rear of the U-shaped bars, in laterally centered relation thereto, immediately of the footrest 125, rises upwardly therefrom and perpendicular thereto to position its uppermost extremity at a location below and spaced from the level of the portions 120 of the loops 119. The post 127 telescopically nests an adjustable tubular extension 129 which is projected upwardly therefrom, coaxially therewith, and releasably fixed thereto by a set screw.

Mounted on and pivotally connected to the upper end of the extension 129 is a tube member 131 which corresponds to the element 66 of the first described embodiment of the invention. A body rest frame 154 having a superposed cushion mounts in an elevated, closely spaced, parallel relation to the tube 131 by means of interconnecting, longitudinally spaced, perpendicularly related short tube sections, seen in FIG. 14. Note that the pivot connection between the tube 131 and the element 129 is located in line with the center of the body rest 154 and the projection of the tube element 131 to the rear of its pivot connection is substantially less than its projection forwardly of this point.

A relatively short rectangular frame member 183 is also fixed in elevated spaced relation to the tube 131, in this instance at a position immediately forward of and at a level above and substantially parallel to the cushioned frame 154. The frame 183 is located to position between and have its lateral extremities adjacent to the plates 121 which respectively project upwardly of the loops 119. The frame 183 has central apertures in its lateral extremities aligned with corresponding apertures in the plates 121 to commonly therewith receive therethrough bolts 144 to which nuts are applied to fix the position of the frame 183. The level of the interconnection of the bolts 144 to the plates 121 will be determined by the size of the person to occupy the cycle. Telescopicallly applied in and projected through and beyond each of the respective ends of the tube 131 is a tubular member 137 the rearmost extremity of which has an upwardly directed perpendicularly projected extension 139 which mounts forwardly thereof a cushioned element 141 opposite and in spaced relation to the rear end of the cushioned portion of the frame 154. The forwardly projected end portion of the tube member 137, at a point beyond the forward extremity of the tube 131, has in connection therewith a radially projected arm 143 through the medium of which the tube 137 may be rotated to dispose the interconnected cushioned element 141 in a dependent relation to the tube 137 thereby to facilitate access to the "seat" of the cycle by its user.

As will be obvious from the drawings, a screw 145 in connection with the tube 131 is used to clamp the member 137 in its selected position of adjustment with respect thereto.

As will be seen, the tube 131 and its associated structure 137, 139, 141, 154 and 183 serve to provide a support and seat for the occupant of the apparatus illustrating a second embodiment of the invention which is disclosed in FIGS. 8-14 of the drawings. Furthermore the pivoted connection of this seat to the adjustable post 127, 129 taken together with an appropriate interconnection thereof with the plates 121 determine by their setting not only the height of this seat to suit the application of the cycle but also the degree of upward inclination of the seat from its rear to its forward end. Such inclination per se is a characteristic of embodiments of this invention and of material therapeutic benefit to their occupant.

A vertical support 151 is fixed transversely of and in bridging, upstanding relation to the upper portions 120 of the loops 119 in an adjacent spaced relation to their forward ends. The upper portion of the support 151 is defined by a single vertically oriented post, the upper extremity of which is welded to a horizontal tube member 152, at a location adjacent and spaced slightly forward of what may be considered to be its rear end. The tube 152 is laterally centered with reference to the loop portions 120 and receives therethrough, in bearing relation thereto, a rod 162 which projects from its respective ends. The forwardly projected extremity of the rod 162 fixedly mounts a bevel gear 142 which is positioned to mesh with the gear 140. At its rear extremity the rod 162 is welded in connection with and perpendicular to a transversely disposed rod 163, at its center.

Mounted about and in a concentric bearing relation to the rod 163, at one end thereof, is a first sleeve 167. The sleeve 167, in turn, mounts thereabout, in bearing relation thereto, a second sleeve 165. The concentric sleeves 167 and 165 have their outer end surfaces in a co-planar relation and so positioned to be co-planar with the projected end surface of that end portion of the rod 163 about which they mount. The sleeve 165 is somewhat shorter in length than the sleeve 167 and inwardly thereof the sleeve 165 mounts thereabout a narrow collar 190. The collar 190 and the portion of the sleeve 167 about which it mounts are provided with aligned tapped apertures into which a short screw is applied to join them for their conjoint rotation about and relative to the rod 163. The collar 190 is welded to and forms the rear end of a lever 181 the purpose of which will be further described. A cap 168 applied over the outermost ends of the sleeves 165 and 167 is secured and maintained in place by a bolt applied through an aperture in its center to threadedly engage in a coaxial, tapped, blind bore in the end of the rod 163 about which the sleeves 167 and 165 concentrically position. Suitable bearing surfaces are provided at the inner surface portions of the cap to facilitate a good bearing relation between the sleeves and the cap, to enable their free bearing and relative rotation as and to the extent required.

An identical set of sleeves 167, 165; cap 168; bolt 166; and collar 190 is identically applied to the opposite end of the rod 163, to similary interrelate, the only difference being that the collar 190 in this instance forms the rear end of a lever 180 which, however, has a construction and purpose like that of the lever 181.

Fixed to each sleeve 165, in a relatively closely spaced relation to the adjacent cap 168, is one end of a short tube 170 which projects radially outward and upward therefrom and perpendicular to its outer surface. The tube 170, in each case, is coaxial with small relatively aligned radial apertures respectively provided in the sleeves 165 and 167. The outer end of each tube 170 is capped by one end portion of one leg of a relatively fixed, relatively narrow plate 173 which has a right angle profile. This leg extends radially outward from and in a direction forwardly of the tube 170, towards the forward end of the frame 116 and has the other leg of the plate 173 in dependent relation thereto at its outermost edge to position in a forwardly spaced relation to the tube 170. A narrow rectangular brake control plate 179 is applied in superposed bearing relation to the forward surface of the dependent leg portion of the plate 173 to have a central aperture therein align with an aperture in the dependent leg portion which together therewith accommodates the projection therethrough of the body of a bolt. A washer is applied to the body of this bolt between the forward surface of the plate 179 and the head of the bolt and a nut is applied to the innermost threaded extremity of the bolt which projects through and beyond the inner surface of the dependent leg.

Two apertures are formed in the leg portion of the plate 173 which caps the upper end of each tube 170, one being aligned with the apertures in the sleeves 167, 165 at the inner end of the tube and the other being disposed outwardly of the tube between it and the dependent leg portion of the plate 173. Based on, fixed in connection with and extending outwardly and upwardly from the respective sides of the end portion of the plate 173 which caps the tube 170 are elements forming therewith a U-shaped handle the base of which is provided by the plate 173 and the projected ends of which are bridged by a transversely disposed rod which mounts thereabout a resilient sleeve to provide a hand grip 175. Overlying the capping end portion of plate 173, and in pivotal connection with a pin 177 which bridges laterally spaced ears in connection with and projected from the rear edge thereof is a plate 176. The plate 176 extends forwardly from the pin 177 to and beyond the forward limit of the underlying plate 173. A loop-type finger grip 178 connected with the upper surface of the plate 176 projects upwardly therefrom and perpendicular thereto at a point adjacent its forward limit. The upper end of the finger grip 178 normally positions in a horizontal plane commonly occupied by the rod mounting the resilient sleeve of the hand grip 175. The plate 176 has two apertures therein and as it is normally disposed in a horizontal attitude, these apertures respectively align with the apertures in the underlying portion of the plate 173.

Prior to the application of the plate 173 in capping relation to the tube 170, each tube 170 has applied therein, coaxially thereof, a control pin 171. The inner end of the pin 171 is arranged to project through the aligned apertures in the sleeves 165, 167 to seat to the rod 163. The outer end of the pin 171 at the same time projects upwardly from the upper end of the tube 170 in which it is placed. Fixed in connection with and about the pin 171, more closely adjacent its inner end than its outer, upper end is a washer-like element the outer peripheral surface of which disposes in bearing relation to the inner surface of the tube 170.

A coil spring 172 disposed about and concentric to the upper portion of the pin 171 has the lower end thereof seated to the washer and its upper end abutted to the undersurface of that end portion of the plate 173 which is set over and fixed to cap the upper end of the tube 170. The spring 172 is thereby placed under compression to normally bias the inner end of the pin 171 against the rod 163. As the plate 173 is applied to cap the upper end of the tube 170 it is so positioned that the upper end of the pin 171 projects through the aperture therein which aligns with the apertures in the sleeves 165 and 167. The upper end of the pin 171 similarly projects through the correspondingly located aperture in the plate 176 as this plate is applied in a superposed relation to the plate 173 as and by the means above described. A nut 174 is threadedly engaged to the upper end of the pin 171 to seat to the upper surface of the plate. It is through the medium of this nut 174 and the bias applied thereto that the plate 176 is normally maintained in an abutted relation to the upper surface of the plate 173.

A conventional bicycle brake is mounted to the end portion of each length of tubing 146 adjacent the forward portion of the rear wheel to which it applies. Each brake has one end of a control cable connected thereto in a manner that the tensioning thereof will induce it to clamp to and apply a braking influence on the rim of the related wheel. The opposite end portion of each cable is in this case threaded through the aligned apertures in the plates 173 and 176, in that order, located outwardly of the tube 170 at the end of the rod 163 most adjacent the brake from which the cable extends, and above the plate 176 is provided with a conventional anchor by virtue of which each cable will move with the plate 176 as and when it is pivoted to and from its base plate 173.

As will be self-evident, from FIGS. 12 and 13, the occupant of the "seat" of the cycle can, at the same time that he or she is gripping the handle portions 175, extend fingers of the hands to overlap the adjacent upper ends of the loop 178 and with a curling of the fingers pull the same back, as a result of which to effectively pivot the plates 176 upwardly, and apply tension to the brake cables, lifting the pins 171 against the bias thereon provided by the spring 172 to, as will be further described, clear either or both the sleeves 165 and 167, as circumstances may require.

The levers 180 and 181 which project forwardly of the rod 163 are parts of the mechanism by means of which the cycle of FIGS. 8 through 14 is propelled. The outer, forward end of the lever 180 has a universal pivot connection to one end of a lever 182 which depends downwardly therefrom, to one side of and spaced outwardly from the fork 136, to have its lower end similarly connected to one end of a drive arm 184, the opposite end of which is drivingly interconnected with one end of the drive axle of the wheel 14. The arm 181 adjacent the opposite end of the rod 163 is similarly connected by way of a lever 193 and drive arm 185 to the opposite end of the drive axle of the wheel 14. Note should be taken of the basic 90° displacement of the arms 184 and 185.

It will be seen from the foregoing that there is ready access to the "seat" of the cycle of FIGS. 8–14 and that the tube 137, 139 can be readily rotated 180° from its normal position to facilitate such access where required. This embodiment of the invention can be used to good advantage by a paraplegic where the lower limbs have not as yet shown sings of function. As will be seen, the construction of the frame 116 and the "seat" of the cycle make it relatively easy to place such a person in position to operate this vehicle. To this end the paraplegic will be so placed as to have his or her lower limbs straddle the tube assembly 131, 137 immediately to the rear of the cushioned frame 141, thereby to provide that the lower limbs of this person depend freely to either side of the tube assembly. As will be obvious from the drawings, the trunk of the person's body will be inclined forwardly over the cushioned frame 154 to have the abdomen comfortably bear on its cushioned surface to the extent required in the forward inclination desired. Normally the components of the "seat" will have been previously adjusted to produce the angle of upward inclination of the seat from its rear to its forward end. This will be determined both to suit the frame of the person for his or her comfort and to work to the desired objective of inducing the paraplegic to use the cycle. In any event, once the person has been placed so as to straddle the tube assembly 131, 137 and the upper portion of his or her body is inclined as described, the assembly 137, 139, 141 will be brought up to comfortably bear on and abut the buttocks at the lower end of the spine and underlie upper portions of the thighs and the hips to produce an orientation of the upper portion of the body facilitating the treatment and results desired and the gripping of the handles 175 by the person's hands. At the same time the lower limbs of the person are brought forward to deposit the feet of the person on the footrest 125.

It will of course be obvious that the cycle of FIGS. 8 through 14 can be utilized by any person, medically disabled or otherwise, with beneficial results not only affording exercise of the arms and hands beneficially reflected in the upper portion of the body but inducing a mental condition contributing to the well being of the person.

Of course suitable adjustments can be made for the comfort of the person at any time.

The construction of the embodiment of FIGS. 8 through 14 provides a uniquely simple means and mode of propulsion of this cycle type vehicle. As will be seen from the drawings, under normal conditions, as shown in FIGS. 10 and 11, through the medium of the pins 171 the grips 175 are coupled to sleeves 165 and 167 and coupled in turn to the collars 190 which form the rear end of the lever elements 180 and 181. All the occupant of the cycle needs to do to commence propulsion is to rock the hand grips forwardly and their interconnected structure back and forth through a limited arc and simultaneously in opposite directions as a result of which to transmit to and through the arms 184 and 185 a driving influence producing a forward rotation of the wheel 14. The arrangement and interconnection provided as between the grips and the drive arms 184 and 185, as related to the axle of the wheel 14 has proven to provide distinct mechanical advantages which facilitate a smooth and rapid propulsion of the cycle with a relatively minimal exertion on the part of its user. At the same time, by tilting the rod 163 in a downward direction by applying a downward force thereto through a hand grip 175, the steering shaft 162 is correspondingly rotated to rotate the interconnected bevel gear 142 and by reason of its mesh with the gear 140 rotate the fork 136 in its bearings within the post 134 and correspondingly turn the wheel 14 in one direction or the other, left or right as needs require. The universal pivot connections provided between the levers embodied in the propulsion system facilitate a very easy and smooth steering of the vehicle. As will be self-evident, from the previous description of the braking system, little exertion is required for the occupant of the cycle to project fingers forwardly from the grips to hook over the loops 178 to apply the brakes to the rear wheels of the vehicle.

The whole construction and arrangement is such to make the use of the apparatus so simple and easy to operate with a maximum degree of safety that confidence is given the user of the vehicle, as well as a sense of well being in providing the person with an ability to transport his or herself with absolutely minimal exertion and yet with beneficial physical as well as mental results.

The propulsion system employed in this embodiment of the invention has such a high degree of both utility and efficiency that it is admirably suited for general use in other types of cycle structures and such is contemplated as being in the spirit and scope of the present invention.

As will be obvious, the embodiments of the invention herein illustrated are only exemplary. Their construction and arrangement may be modified in various manner which should be obvious without departing from the spirit and scope of the invention as recited in the accompanying claims.

Particular emphasis is made with reference to the simplicity and utility of the chassis of the vehicles, in the case illustrated being essentially comprised of two interconnected loops of tubing. Even more importantly, what is a mutual characteristic of the embodiments illustrated is the requirement for and the structure providing an inclination of the "seat" of the user of each vehicle. As will be self-evident, this distributes the load of the body and establishes an orientation thereof, as dictated by the treatment prescription which will best serve the desired end result. The embodiment of FIGS. 1 through 7 is most preferred in that the medical benefits can be significant in use thereof for exercise once the person's physical condition and reactions can be stimulated. As should be obvious, initial approach may be through the use of the embodiment of FIGS. 8–14.

The foregoing, including the summary of the invention should distinctly point out the objectives and benefits achieved by the invention which not only lend an advance in the field of therapy but provides, as an incident thereof devices having general exercising value and utilitarian purposes. Most significant is the speed and ease of transportation enabled by the invention as well as its economical cost.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. An exercising, recreational and utilitarian apparatus comprising a mobile chassis having forward and rearward ends referenced to a normal direction of motion, a chassis mounted support for mid and upper portions of the body of a person using the apparatus, means for positioning said support in said chassis in an inclined attitude of use in which a forward end thereof is elevated relative to a rearward end, a substantially forwardly facing seat at the rearward end of said support, a substantially upwardly facing body rest member on said support forwardly of said seat, a person using the apparatus straddling said support and inclining forwardly with a mid body section resting on said body rest member and said seat backing up buttock body portions, and apparatus controls accessible to the hands of a person so situated, wheels supporting said chassis, said wheels being disposed so that one portion thereof is in a longitudinally spaced relation to another, one of said wheels including a portion thereof supported on and in connection with a shaft bearing for rotation in and relative to bearing support means in connection with said chassis, control means for said portion of said one wheel, said control means including hand operable lever means at least a portion of which is mounted for rotation on and relative to said chassis adjacent and forwardly of said body support, said lever means being operatively connected to said shaft for drive thereof and said portion of said one wheel thereby to effect a propulsion of said chassis.

2. A cycle type vehicle as set forth in claim 1 including two of said hand operable lever means, one for the left hand and one for the right hand of the person supported by said chassis and said lever means being interconnected to said shaft for simultaneous operation thereof to commonly drive said shaft and said portion of said one wheel thereby.

3. Apparatus as in claim 2 characterized in that said lever means are cooperatively arranged to produce increments of rotational motion of said shaft by a manipulation thereof in a respectively back and forth relation in a manner that said lever means, in any one instance are moving in opposite directions.

4. Apparatus as in claim 1 including steering means for said chassis and said hand operated lever means being mounted on said steering means.

5. Apparatus as in claim 4, wherein said lever means and said steering means are interconnected to provide for their simultaneous or selective function, as needs require.

6. An exercising, recreational and utiltarian apparatus comprising a chassis including a relatively centered base portion elevated from the underlying base surface on which said chassis is placed in use, a vertically extensible support in connection with and rising upwardly from said elevated base portion, the upper end of said vertically extensible support having thereon a pivotally interconnected, narrow, elongate body support which runs lengthwise of said chassis, said bodyf support having a rear end and a forward end and means interconnecting therewith to maintain it in a forwardly and upwardly inclined position with reference to said chassis in use thereof, said elongate body support including an elongate base having a direct connection to said vertically extensible support, from the rear end portion of which base rises a normally upwardly projected forwardly facing means to serve as a load accommodating abutment surface to seat that portion of the user's buttocks which underly the spine and influence thereby a forwardly and upwardly inclined attitude of the upper portion of the user's torso, and means over said elongate base of said body support spaced forwardly of said load accommodating abutment surface serving as an underlying rest for the abdomen of the user, freeing use of the user's hands to manipulate controls connected with said chassis at a location forward of said body support, said body support serving in the process to take the major portion of the load of the body of the user and relieve the user's lower extremities from any significant load thereon as the user's feet rest on said elevated base portion of said chassis.

7. Apparatus as in claim 6 wherein said chassis has means to render it mobile and said controls include hand grips having means interconnected therewith constructed and arranged to produce a propulsion of said means rendering said chassis mobile and a propulsion of said chassis thereby.

8. Apparatus as in claim 6 wherein said chassis comprises a frame including side portions and a forward portion defining a protective cage for the lower portion of the body of the user of said apparatus.

9. Apparatus as in claim 8 wherein said load accommodating abutment surface is displaceable and said protective cage has an opening thereto to facilitate the mount of the body of a user to said elongate body support from the rear thereof, thereby making said apparatus particularly advantageous for use by one having lower extremities which are weak or otherwise physically impaired.

10. An exercising, recreational and utilitarian apparatus comprising a mobile chassis having forward and rearward ends referenced to a normal direction of motion, a chassis mounted support for mid and upper portions of the body of a person using the apparatus, means for positioning said support in said chassis in an inclined attitude of use in which a forward end thereof is elevated relative to a rearward end, a substantially forwardly facing seat at the rearward end of said support, a substantially upwardly facing body rest member on said support forwardly of said seat, a person using the apparatus straddling said support and inclining forwardly with a mid body section resting on said body rest member and said seat backing up buttock body portions, and apparatus controls accessible to the hands of a person so situated, said support including a relatively extensible portion mounting said seat, and means for extending and retracting said extensible portion to set and reset said seat more distant from and more closely to said body rest member according to the requirements of a user.

11. Apparatus as in claim 10, said extensible portion being rotatable to allow said seat to be adjusted to a dependent relation to said support to facilitate entrance and exit of a user to and from said apparatus by way of the rear thereof.

12. Apparatus as in claim 11, said means for extending and retracting said extensible portion and for effecting rotary adjustments thereof including manual means located forwardly of said body rest member in position to be easily accessible to a hand of a user.

* * * * *

UNITED STATES PATENT AND TRADEMARK OFFICE
CERTIFICATE OF CORRECTION

PATENT NO.   : 4,798,395
DATED        : Jan. 17, 1989
INVENTOR(S)  : Shaffer et al It is certified that error appears in the above-identified patent and that said Letters Patent is hereby corrected as shown below:

Col. 4, line 68, "read" is corrected to read -- rear --.

Col. 12, line 52, "requried" is corrected to read -- required --.

Col. 13, line 6, "that" is corrected to read -- than --.

Col. 21, line 48, (claim 6, line 9) "bodyfsupport" is corrected to read -- body support.

Signed and Sealed this

Twenty-eighth Day of November 1989

*Attest:*

JEFFREY M. SAMUELS

*Attesting Officer*     *Acting Commissioner of Patents and Trademarks*

UNITED STATES PATENT AND TRADEMARK OFFICE
CERTIFICATE OF CORRECTION

PATENT NO. : 4,798,395
DATED : January 17, 1989
INVENTOR(S) : Don T. Shaffer and Emmert Milyard It is certified that error appears in the above-identified patent and that said Letters Patent is hereby corrected as shown below:

Col. 18, line 55, "sings" is corrected to read -- signs --.

Signed and Sealed this

Third Day of July, 1990

*Attest:*

HARRY F. MANBECK, JR.

*Attesting Officer*  *Commissioner of Patents and Trademarks*